Oct. 6, 1931.  H. RABEZZANA  1,826,404
SPARK PLUG WITH A RUFF NECK BUSHING
Filed Dec. 7, 1928
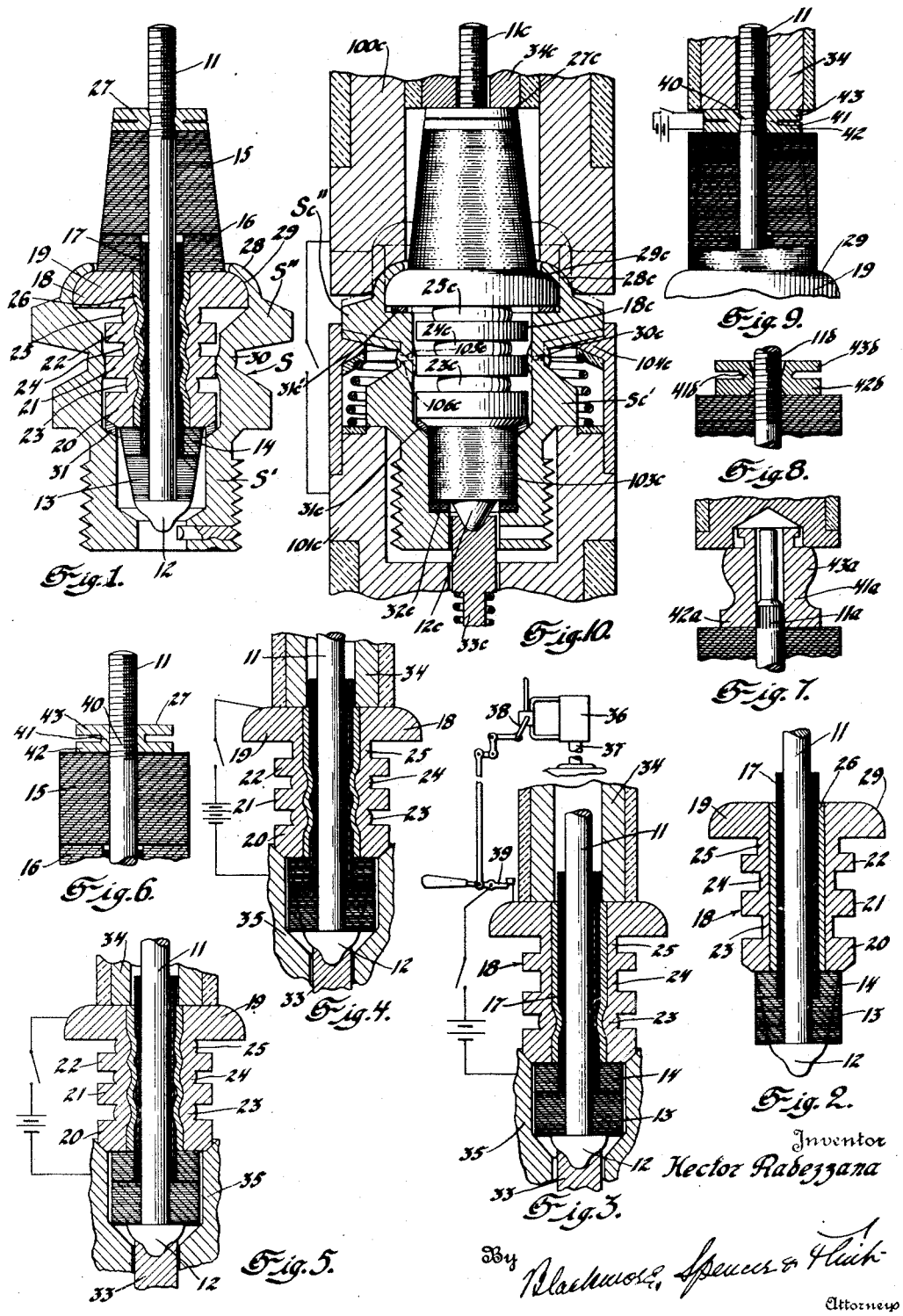

Patented Oct. 6, 1931

1,826,404

UNITED STATES PATENT OFFICE

HECTOR RABEZZANA, OF FLINT, MICHIGAN, ASSIGNOR TO A C SPARK PLUG COMPANY, OF FLINT, MICHIGAN, A COMPANY OF MICHIGAN

SPARK PLUG WITH A RUFF NECK BUSHING

Application filed December 7, 1928. Serial No. 324,510.

The present invention aims particularly at improvements in spark plugs of those types in which some use is made of so-called "cigarettes" or sleeves formed of mica or the like,—said sleeves being typically disposed in contact with the inner electrodes of the spark plugs referred to; and typical embodiments of this invention may involve some use of a so-called "multiple-collar" or "ruff-neck" stop or bushing adapted to surround such insulation and to be collapsed thereon at more than one level,—to serve as a retaining stop, to prevent leakage, and to carry a shell.

This invention aims, in preferred embodiments thereof, at the provision and the utilization of bushings comprising concave or flat-topped and rounded heads which adapt them for interposition between inner insulation assemblies and outer insulation assemblies,—one or both of said assemblies being preferably formed of mica washers and a deformable protective tube being preferably so interposed, externally of the mentioned "cigarette", as to apply a radially constrictive pressure therethrough, for a leak-preventing effect; and constrictions or deformation zones, spaced apart by rings or collars on said bushings, preferably differ in cross-sectional area in such a manner as to adapt the same to be consecutively and thermoplastically collapsed, to produce a series of annular and inwardly-extending beads suitable to the purpose above referred to.

This invention should be understood to relate not only to parts and products mentioned, but to means and methods adapted thereto. The illustrations herewith will be found to suggest the use of collapsible "nuts" in the retention of an exterior insulation assembly; and the use of such a thermoplastic collapse or consolidation of parts of an outer shell as to hold mentioned inner parts permanently therein; but it should be understood that the mentioned zone-provided bushings or tubular elements may be variously used; that the mentioned shells are not necessarily of one-piece construction; and that the objects of this invention, including various alternative and optional features, may be best appreciated in connection with the following description, the appended claims and the accompanying drawings.

In the drawings:

Fig. 1 is a vertical or longitudinal section through one type of spark plug made in accordance with the principles of this invention.

Fig. 2 is a view taken similarly to Fig. 1, but showing only an interior mica washer assembly, a "ruff-neck" bushing, and parts extending therethrough in readiness for an axial (longitudinal) compression,—to produce successive deformations or leak-preventing collapses of the weakened zones of said bushing.

Figs. 3 to 5, inclusive, are vertical sections suggesting advantageous means and methods for use in subjecting the weakened zones of the mentioned bushing successively to thermoplastic collapse.

Figs. 6, 7 and 8 are vertical sections showing some of the various types of collapsible nuts among which a selection may be made in the securing of, for example, an exterior insulation assembly in engagement with the mentioned bushing.

Fig. 9 is a similar view, illustrating the result of a deformation of one of the mentioned nuts by an application of pressure therethrough,—as may be done subsequently to the steps shown in Figs. 3, 4, 5.

Fig. 10 is a similar view, intended primarily to show a step (which may follow steps illustrated in previous figures) whereby a special shell has been secured to the mentioned bushing; but this view is utilized also to suggest various alternative and optional features hereinafter referred to.

An electrode spindle (whose parts are shown in elevation in Fig. 10) is illustrated in Fig. 1 as comprising, in addition to a tensionable central electrode element 11, having an integral head, a so-called "ruff-neck" bushing, adapted to serve as a stop for both an interior insulation assembly and an exterior insulation assembly,—the former comprising a small-aperture sheaf 13 of mica washers and a larger-aperture sheaf 14 thereof, and the latter comprising comparable sheaves 15 and 16 of similar laminated insulation. The respective small-aperture sheaves 13 and 15 being adapted snugly to fit the electrode element 11, the larger apertures provided in sheaves 14 and 16 are intended similarly to receive a so-called "cigarette" 17, of mica or the like; and the present invention is to be understood to relate more particularly to the construction and mode of use of a "ruff-neck" bushing 18 comprising, in addition to a flat-topped head 19, a somewhat elongated neck provided with a series of rings or collars 20, 21, 22, which serve to space apart weakened zones 23, 24, 25,—adapted to be inwardly collapsed by axial pressure applied through said head.

A protecting tube 26, shown as approximately equal to the bushing 18 in length, is adapted to respond to constrictive pressure produced by thermoplastic or other deformation of the zones 23—25; a special "nut" 27, adapted to transmit a predetermined pressure before undergoing collapse upon the electrode 11, may be permanently secured, as by welding; and the entire spindle so provided may be secured within any suitable spark plug shell.

The shell S is shown as comprising an externally threaded lower or cylinder-engaging section S' and upper or wrench-receiving section S'',—the latter including an inwardly deformed flange 28, engaging a rounded shoulder 29 of the bushing head 19; similar shell sections Sc' and Sc'' are shown in Fig. 10; and a presumably final compressive action may be obtained by a thermoplastic collapse of intermediate zones 30 and 30c of said shells. In advance of the deformation of flange 28 or 28c and/or the collapse of a weakened zone 30, 30c, an additional compressible element such as a gasket 31 (or gaskets 31c, 31c'), and/or a sheaf of auxiliary insulation, of the general character suggested at 32c, Fig. 10, may be so interposed as to undergo a final compression incidentally to a cooling of zone 30 or 30c, subsequently to the collapse of the shell S of Fig. 1, or incidentally to any similar steps, as diagrammatically suggested in connection with Fig. 10.

Referring to Fig. 2, it will be seen that the respective collapsible or deformable zones 23, 24, 25 are so formed, by varying the cross-sectional areas thereof, that the lowermost and innermost of these zones is the easiest to subject to an inward deformation by an application of pressure, or of pressure and electric heating, after an interior insulation assembly, such as that comprising mica sheaves 13 and 14, has been duly compressed. As suggested in Fig. 3, the electrode head 12 may be supported by a pressure-limiting element 33, such as a yieldably supported die, during advance of an upper die 34 relatively to a lower die 35,—as may be effected by hydraulic or other means symbolized by a cylinder 36 from which projects a piston rod 37 whose movements may be controllable by manipulation of a valve lever 38; and, upon the attainment of the desired compressive effect, an electric current, controlled by a switch 39, may be so passed through the bushing 18 as to assure, in view of the mentioned compression, a collapse of the lowermost weakened zone 23. As also suggested in Fig. 3, taken in connection with Figs. 4 and 5, the valve lever 38 and the switch 39 may be so connected as to assure a suitable timing of successive advances of the die 34 and a coordination of such advances with appropriate movement of switch 39; and it will be understood that, upon a prompt cooling of the collapsed zone 23, a repetition of described movements (the zone 24 being then of less cross-sectional area than the zone 23) may be effective to collapse the zone 24,—a third depression of the die 34, followed by a closing of the switch 39, being effective to collapse the uppermost zone 25 of the bushing 18. The weakened zones need not differ by more than (say) twenty thousandths of an inch; and sufficient cooling occurs very quickly. Pressures of about 2000 pounds are sufficient, in this connection.

An inner electrode assembly completed in the general manner illustrated in Fig. 5 may obviously, be employed in any one of a variety of ways, its permeability to oils, acids and/or gases being practically zero; but it is suggested in Figs. 6–9 that, the insulation sheaves 16 and 15 and a collapsible "nut" 27 being successively slid on an upwardly extending and threaded or roughened part 40 of the electrode 11, a suitable depression of any upper die 34, followed by a momentary passage of current through a reduced zone 41 of said "nut", may so secure said "nut", preferably by welding the same in place, as to complete a spindle suitable for compression in a collapsible shell substantially as suggested in Figs. 1 and 10.

Initially slidable "nuts" shown in Figs. 6 and 7, and shells such as are shown in Figs. 1 and 10 being respectively claimed in companion applications S. N. 324,513 filed December 7, 1928, and S. N. 324,511 filed December 7, 1928, attention may be herein called to certain advantages that may be obtained by providing (either through a special configuration of the upper end of a tensionable electrode element 11, 11a or 11b, or through a special distribution of metal in a "nut" having a weakened zone, as suggested in Fig. 8) for an initial and thread-stripping or similar contact, between the nut and minor projections upon a tensionable element, mainly or only in a region opposite a lower or inner flange 42 (or 42a or 42b) of the "nut". Such a construction may be favored, for example, in case an electric current is to be passed, by way of a collapsible zone 41 (or 41a or 41b) from an upper flange 43 (or 43a or 43b) thereof to and through such tensionable element; but this detail of construction, to predetermine a path of initial flow, as also the technique that may be employed in securing the resultant spindle within a shell of any preferred character, is obviously of subordinate importance as compared with the described improvements relating to the form and use of bushing 18.

Primarily for the purpose of emphasizing the breadth of the field within which the more important features of the present invention are suitable for employment, an electrode spindle or assembled unit of the general character above described is shown in Fig. 10 as disposed within a shell that is positioned between dies 100c, 101c, these and associated elements being adapted to cooperate in producing an inward collapse of said shell at 30c and/or a deformation of an upstanding flange 28c, if the latter is provided, for a locking engagement with a rounded shoulder 29c or any suitable part of "ruffneck" or other bushing 18c.

Assuming that inner and/or outer assemblies have been previously shaped and polished to any desired degree, final thermoplastic operations involving dies 100c, 101c may result in the desired final product; but Fig. 10 is incidentally employed to illustrate additional and optional features. For example, this figure suggests the use of an upper shell section Sc″ initially distinct from a lower section Sc′ that is receptacular in form,—to provide a seat for the auxiliary sheaf 32c of mica washers, or the like. This sheaf 32c, if used, may be placed and retained under compression through an inner insulation assembly which snugly fits within a cylindrical surface 103c; and walls adjacent said auxiliary sheaf are shown (with exaggeration) as respectively providing a slight inward and a slight outward taper toward the line of their intersection,—these optional features tending to assure a wedging fit at the outer edges of the auxiliary assembly and to facilitate an exceptionally high compression at the inner edges thereof, favorably to heat conduction from the region opposite the electrode head 12c.

It may be of interest to note that (whether or not the mentioned auxiliary assembly or any auxiliary assembly is disposed in the bottom of a shell section, and whether or not the lower portion S′ or Sc′ of any shell is employed, during assembly, as if it were a part of the stationary die 101c) an inner electrode assembly, a "cigarette", a protecting tube and a bushing 18c being disposed in any preferred way upon a tensionable electrode element 11c, and an outer insulation assembly being added at any suitable time, pressures appropriate not only to the compacting of one or both the mentioned insulation assemblies but to the collapse of said bushing, or its equivalent, may be applied either through die 100c or through a die 34c, assumed to be separately movable. The compacting of the auxiliary insulation 32c, if used, and/or the collapse of any gasket 31c, 31c′ may preferably occur, if the pressure-limiting die 33c is used, after the complete compacting of the mentioned inner assembly and the collapse of some or all of the weakened zones 23c, 24c, 25c; and the provision of any vertically movable and yieldably supported guide element 104c, having limited play relatively to die 101c, may ordinarily be disposed with. Pressures such as 4200 pounds may be employed in the collapse of nuts and shell flanges or weakened zones, as described; but the flanges 28, 28c may be collapsed cold; and collapse of any nut 27, 27c, although it may ordinarily occur as a final step in preformation of a complete inner electrode spindle, may obviously be effected, subsequently to a use of insulation-compacting pressures applied therethrough, at any time when the bushing 18 or 18c is suitably supported or advanced, and either by means of a current returned through an inner insulation-contacting flange, as suggested in Figs. 6 and 9, or by conduction through the main electrode and its head, as suggested in Figs. 8 and 10; and it may also be noted as theoretically possible, in case opposing surfaces are suitably formed (and whether or not a plurality of gaskets are interposed as suggested at 31c and 31c′, Fig. 10) to let inward deformation of an upstanding flange 28c, for an interlocking effect, precede mentioned collapsing operations; but, whether or not gaskets such as are suggested at 31, 31c and 31c′ and/or any auxiliary sheaves of insulation are to be subjected to an especially high compression, a collapse such as that suggested at 30 and at 30c may advantageously be a final thermoplastic step,—to insure a maximum sealing and compressing effect, due to contraction upon cooling, as well as to pressure applied while hot.

As suggested in Fig. 10, this final thermoplastic step may be so executed (whether or not the shell sections Sc′ and Sc″ are initially so distinct, as suggested by dotted lines 105c and 106c, as to prevent premature conduction therebetween) that the intermediate deformation of the shell results in an additional interlocking and/or an actual welding of the shell to the bushing therein; but it will be understood that, as in the simple and practical form shown in Fig. 1, the collapse at 30 may be so executed as to avoid any risk in regard to the seating and proper functioning of gasket 31, incidentally compressed; and, whether or not the lower die 35 of Figs. 3–6 inclusive is, in practice, a lower section of a shell element adapted presently to undergo deformation as described (optionally in the same operation but subsequently to collapse of a bushing and/or a nut) it will be understood that especial importance is herein attached to the form of the described "ruff-neck" bushing and to the described constructions and methods whereby the sequence of series of collapses of weakened zones (whether provided in bushings or other tubular elements) may be predetermined.

Although the foregoing disclosures include complete details of but a limited number of practical embodiments of the present invention, alternative constructions and modes of assembly being incidentally suggested, it should be understood not only that various features of the present invention may be separately employed but also that numerous modifications, additional to those suggested therein, may easily be devised,—all within the spirit and scope of the present invention.

I claim:

1. In a spark plug: an electrode; a compressible insulating sleeve disposed thereon; and a so-called ruff-neck bushing surrounding said sleeve element and providing a plurality of spaced deformation zones which compress the sleeve against said electrode.

2. In a spark plug, an electrode, an insulating sleeve disposed thereon, and a so-called ruff-neck bushing surrounding said sleeve element and providing a plurality of spaced deformation zones spaced apart by collars which exceed said zones in cross-sectional area.

3. In a spark plug: an electrode; an insulating sleeve disposed thereon; and a so-called ruff-neck bushing surrounding said sleeve element and providing a plurality of spaced deformation zones, the terminal faces of said bushing being respectively adapted to engage an inner insulating assembly and an outer insulating assembly.

4. In a spark plug: an electrode; an insulating sleeve disposed thereon, and a so-called ruff-neck bushing surrounding said sleeve element and providing a plurality of spaced deformation zones, said electrode being provided with a head and with an insulating assembly interposed between said head and said bushing.

5. In a spark plug: an electrode; an insulating sleeve disposed thereon; and a so-called ruff-neck bushing surrounding said sleeve element and providing a plurality of spaced deformation zones, said electrode being provided with a head and with an insulating assembly interposed between said head and said bushing, and said insulating sleeve being surrounded in part by said insulation assembly.

6. For use in a spark plug comprising an insulation sleeve element disposed on an inner electrode and within a conductive shell, a bushing comprising: a head; and a neck which is provided with a series of spaced inward-deformation zones.

7. For use in a spark plug comprising an insulation sleeve element disposed on an inner electrode and within a conductive shell, a bushing comprising: a head; and a neck which is provided with a series of spaced inward deformation zones differing in cross-sectional area.

8. For use in a spark plug comprising an insulation sleeve element disposed on an inner electrode and within a conductive shell, a bushing comprising: a head; and a neck which is provided with a series of spaced inward deformation zones differing in cross-sectional area, the zone that is most remote from said head being easiest deformed.

9. For use in a spark plug comprising an insulation sleeve element disposed on an inner electrode and within a conductive shell, a bushing comprising: a head; and a neck which is provided with a series of spaced inward deformation zones, said head being provided with shoulder which is shaped suitably for an interlocking engagement with a shell.

10. For use in securing parts under pressure in substantially concentric relationship: a tubular element providing a series of annular zones of weakness spaced apart by pressure-transmitting collars.

11. For use in securing parts under pressure in substantially concentric relationship: a tube providing a series of annular zones of weakness spaced apart by pressure-transmitting zones,—said zones of weakness being so graduated in cross-sectional areas as to predetermine a sequence of collapse.

12. A spark plug comprising, within a shell, a so-called electrode spindle including: an interior mica washer assembly and an exterior mica washer assembly, an electrode, a mica sleeve; and a bushing so interposed between said assemblies as to serve as a retaining stop,—said bushing including a neck which surrounds said sleeve and which has been collapsed at a plurality of levels, in leak-preventing relationship to said electrode and said sleeve.

13. A spark plug as defined in claim 12 in which a deformable protecting tube is interposed between said bushing and said sleeve.

14. A spark plug as defined in claim 12 in which said shell includes a zone which is so collapsed as to retain said bushing under an increased compression upon cooling.

15. A spark plug as defined in claim 12 in which a plurality of compressible elements, additional to said spindle, are compressed between an element of said spindle and cooperating parts of said shell, said shell comprising a zone so collapsed as to retain said bushing and said compressible elements under increasing pressure upon cooling.

16. In the securing of parts under axial pressure and in concentric relationships, a method which comprises: disposing an element which is provided with a series of zones favorable to radial deformation under a predetermined axial pressure in concentric relationship with an element extending therethrough, interposing an insulating sleeve between said elements, and producing such axial pressure upon the former element as to first position and then deform the same relatively to the element extending therethrough.

17. In the securing of parts under axial pressure and in concentric relationships, a method which comprises: disposing an element which is provided with a series of zones favorable to radial deformation under a predetermined axial pressure in concentric relationship with an element extending therethrough, interposing an insulating sleeve between said elements, interposing a deformable protecting tube between the first mentioned element and said insulating sleeve, and producing such axial pressure upon the former element as to first position and then deform the same relatively to the element extending therethrough.

In testimony whereof I affix my signature.

HECTOR RABEZZANA.